(12) United States Patent
Nicholls et al.

(10) Patent No.: US 7,149,727 B1
(45) Date of Patent: Dec. 12, 2006

(54) COMPUTERIZED SYSTEM AND METHOD FOR PROVIDING COST SAVINGS FOR CONSUMERS

(75) Inventors: Kevin J. Nicholls, Liberty Lake, WA (US); Edward D. Schlect, Jr., Spokane, WA (US)

(73) Assignee: Avista Advantage, Inc., Spokane, WA (US)

( * ) Notice: Subject to any disclaimer, the term of this patent is extended or adjusted under 35 U.S.C. 154(b) by 1120 days.

(21) Appl. No.: 09/704,425

(22) Filed: Nov. 1, 2000

(51) Int. Cl.
*G01R 11/56* (2006.01)

(52) U.S. Cl. ..................................... 705/412
(58) Field of Classification Search ................ 705/26, 705/27, 400, 412, 413, 23
See application file for complete search history.

(56) References Cited

U.S. PATENT DOCUMENTS

| | | | | |
|---|---|---|---|---|
| 4,992,940 A | * | 2/1991 | Dworkin ...................... | 705/26 |
| 5,483,445 A | * | 1/1996 | Pickering ..................... | 705/40 |
| 5,684,965 A | * | 11/1997 | Pickering ..................... | 705/34 |
| 5,930,773 A | | 7/1999 | Crooks et al. ................ | 705/30 |
| 5,943,656 A | | 8/1999 | Crooks et al. ................ | 705/30 |
| 6,035,285 A | | 3/2000 | Schlect et al. ............... | 705/30 |
| 6,052,671 A | | 4/2000 | Crooks et al. ................ | 705/34 |
| 6,088,688 A | | 7/2000 | Crooks et al. ............... | 705/412 |
| 6,556,976 B1 | * | 4/2003 | Callen ......................... | 705/37 |
| 6,704,742 B1 | * | 3/2004 | Huth et al. ................. | 707/102 |

FOREIGN PATENT DOCUMENTS

WO    WO 96/29578 A1 *  9/1996

OTHER PUBLICATIONS

Arkansas Business: "Utility Billing Consultants"; Dec. 9, 1991, vol. 8, No. 50, p. 31.*
Washington Gas Website, Jan. 28, 1999, 4 pages.*

* cited by examiner

*Primary Examiner*—Thomas A. Dixon
(74) *Attorney, Agent, or Firm*—Wells St. John P.S.

(57) ABSTRACT

A computerized system and method for providing cost savings for utility users is shown and which includes defining a database in a host computer; storing in the database variable business information from a plurality of goods and services providers; receiving into the host computer goods and services related consumption information and determining an optimal business expense from the variable business expense information to provide cost savings for the customer; processing the optimal business expense information, and goods and services consumption information to provide usage-based computer viewable data which is associated with a consumer's consumption of the goods and services; and providing the customer with computer access to the computer viewable data and wherein the customer can view the computer viewable data, from a location remote to the host computer.

32 Claims, 9 Drawing Sheets

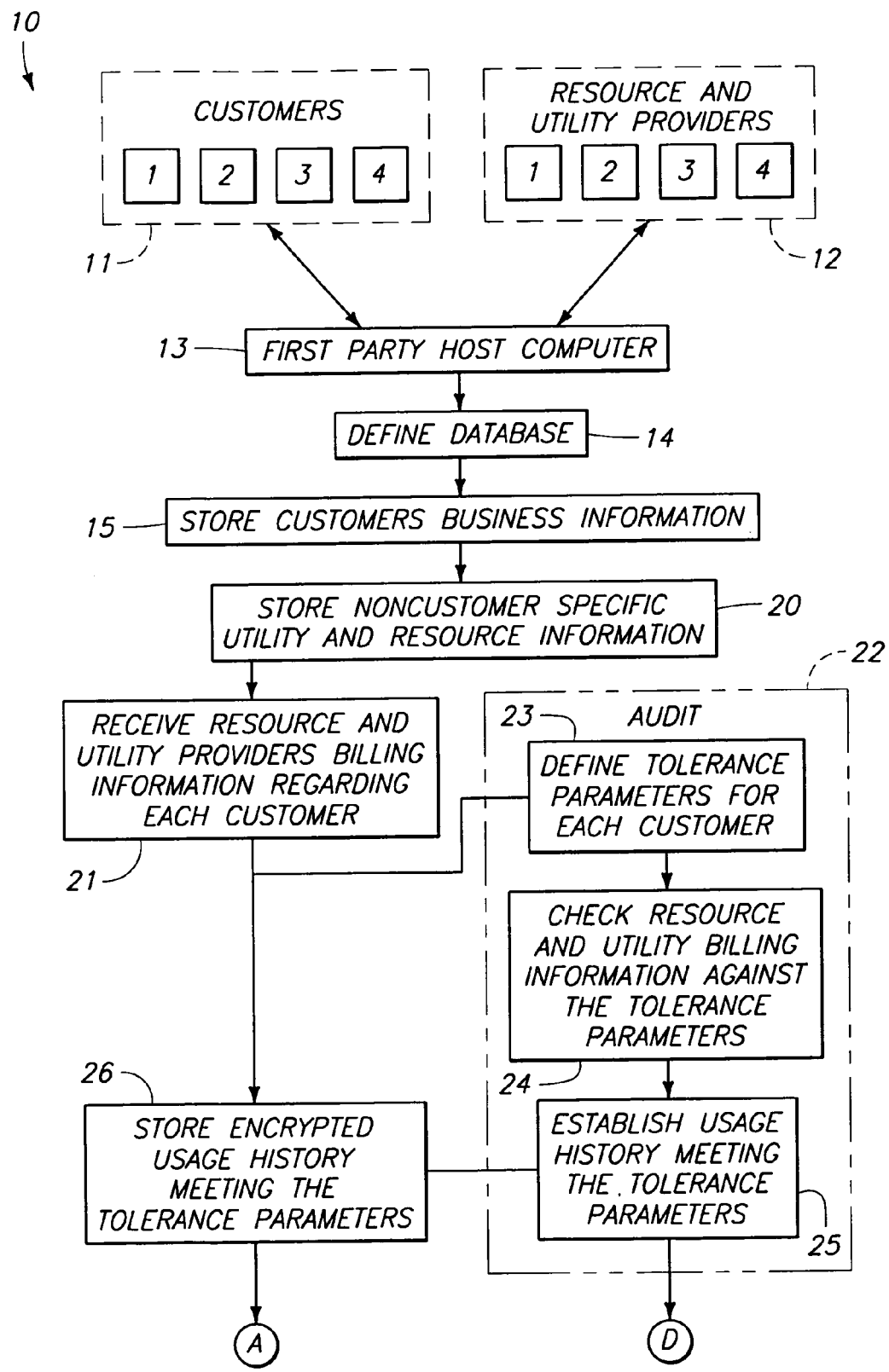

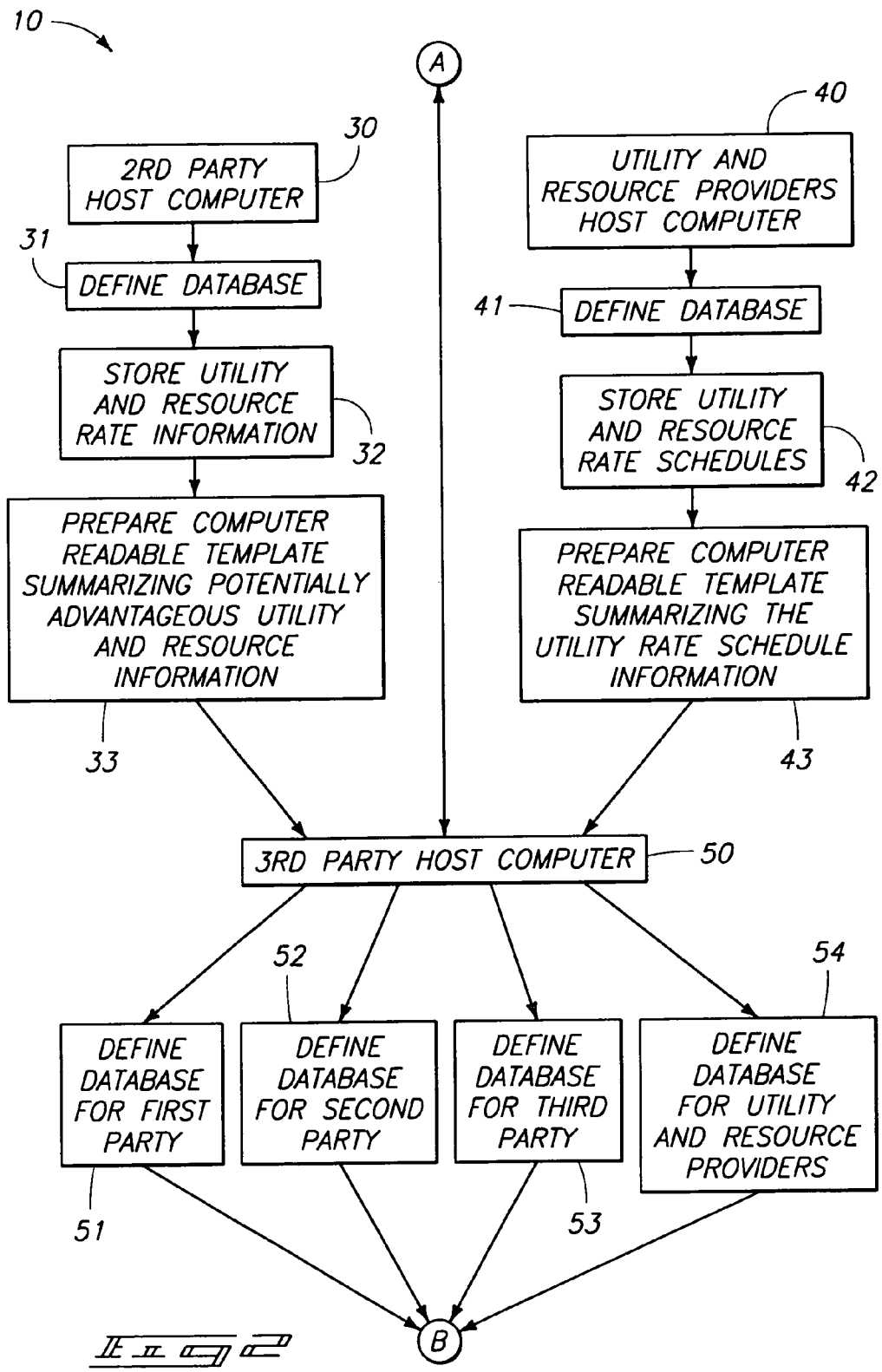

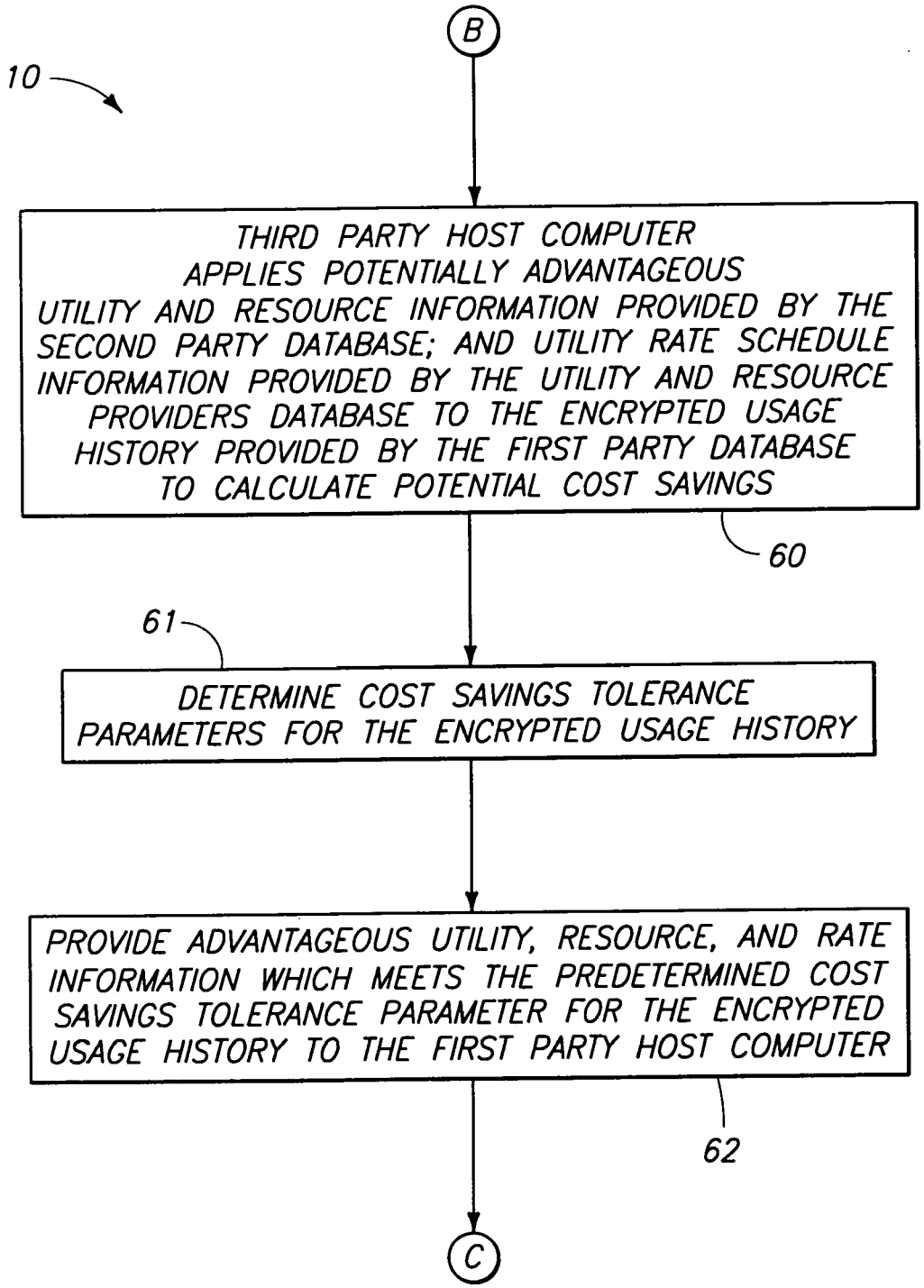

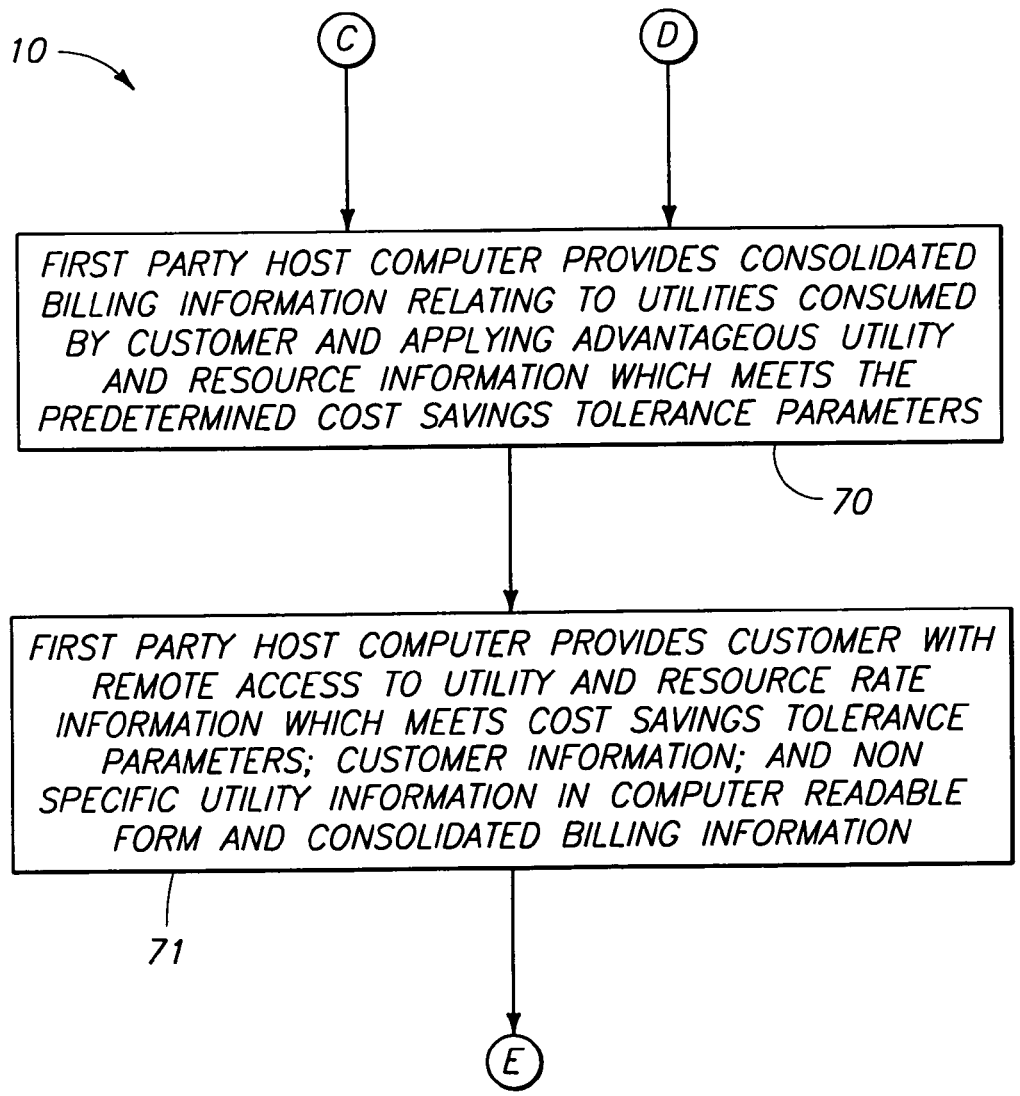

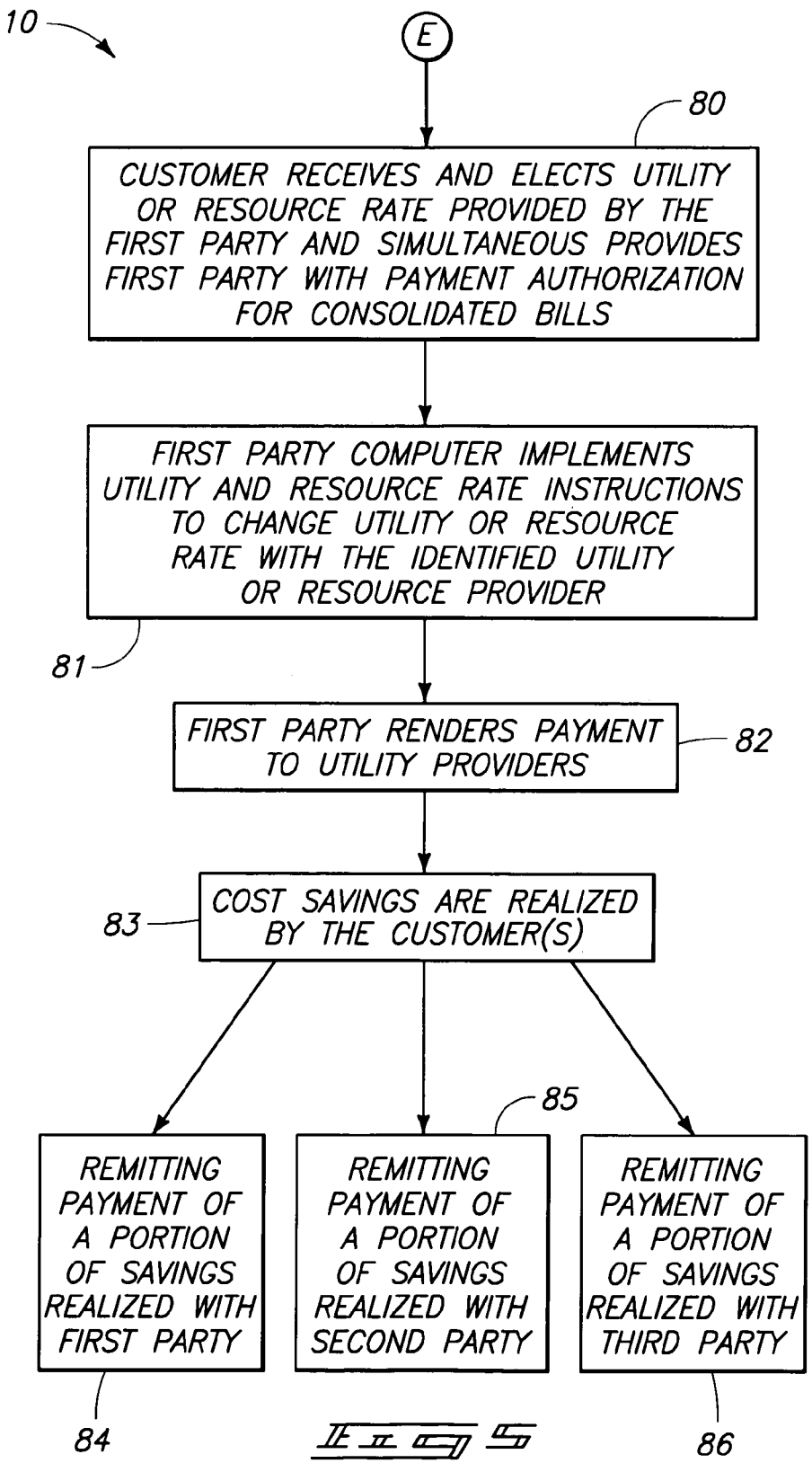

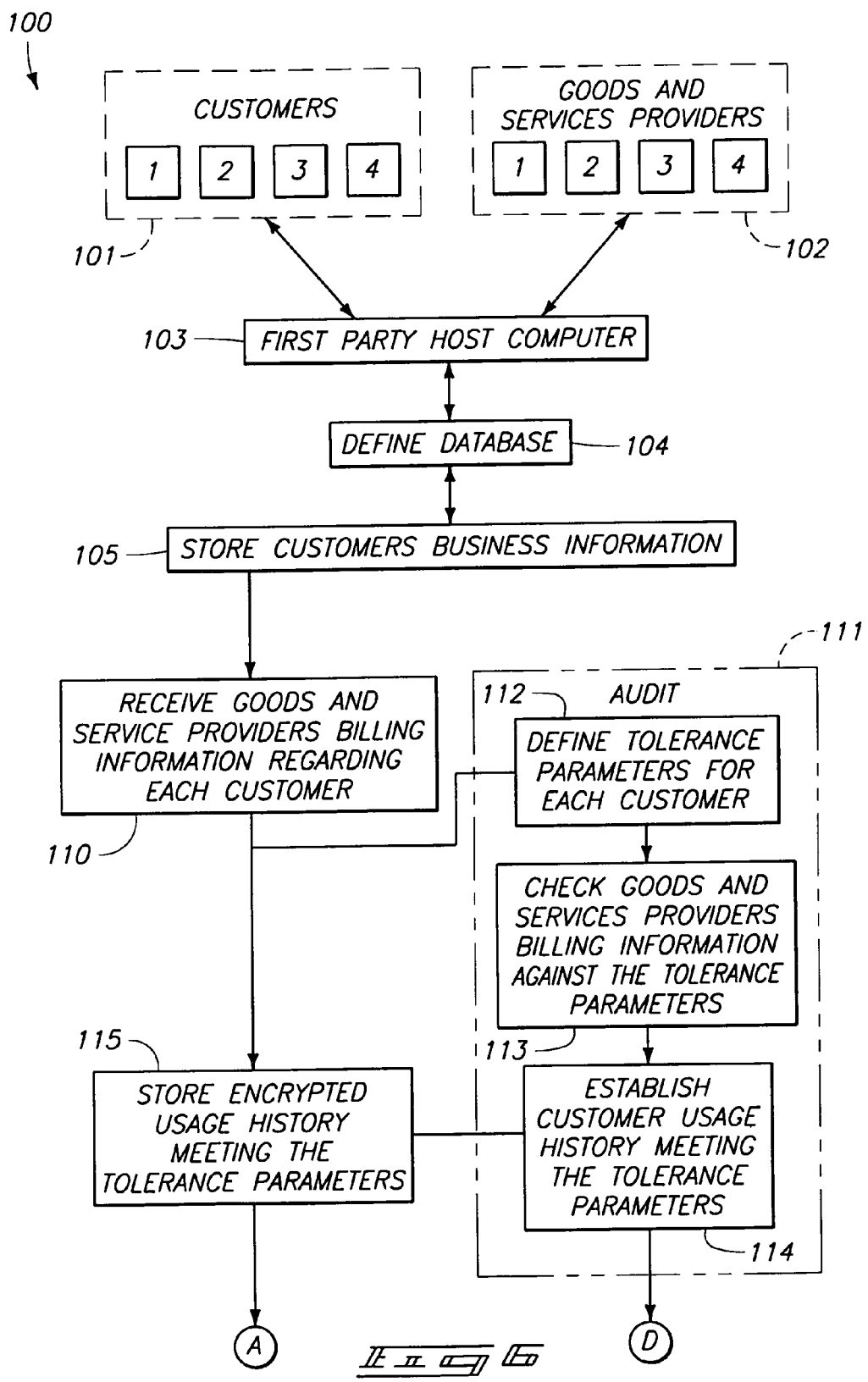

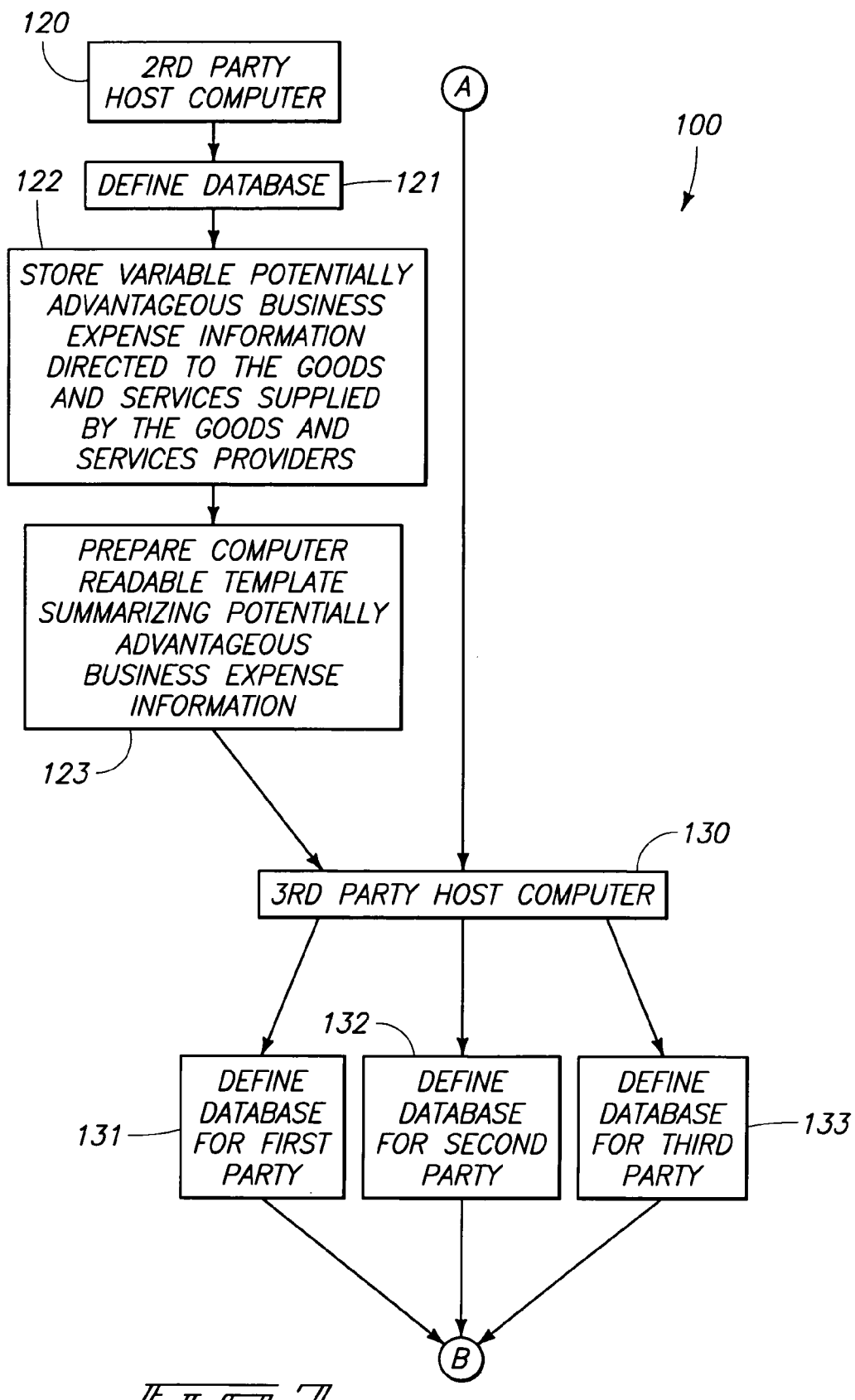

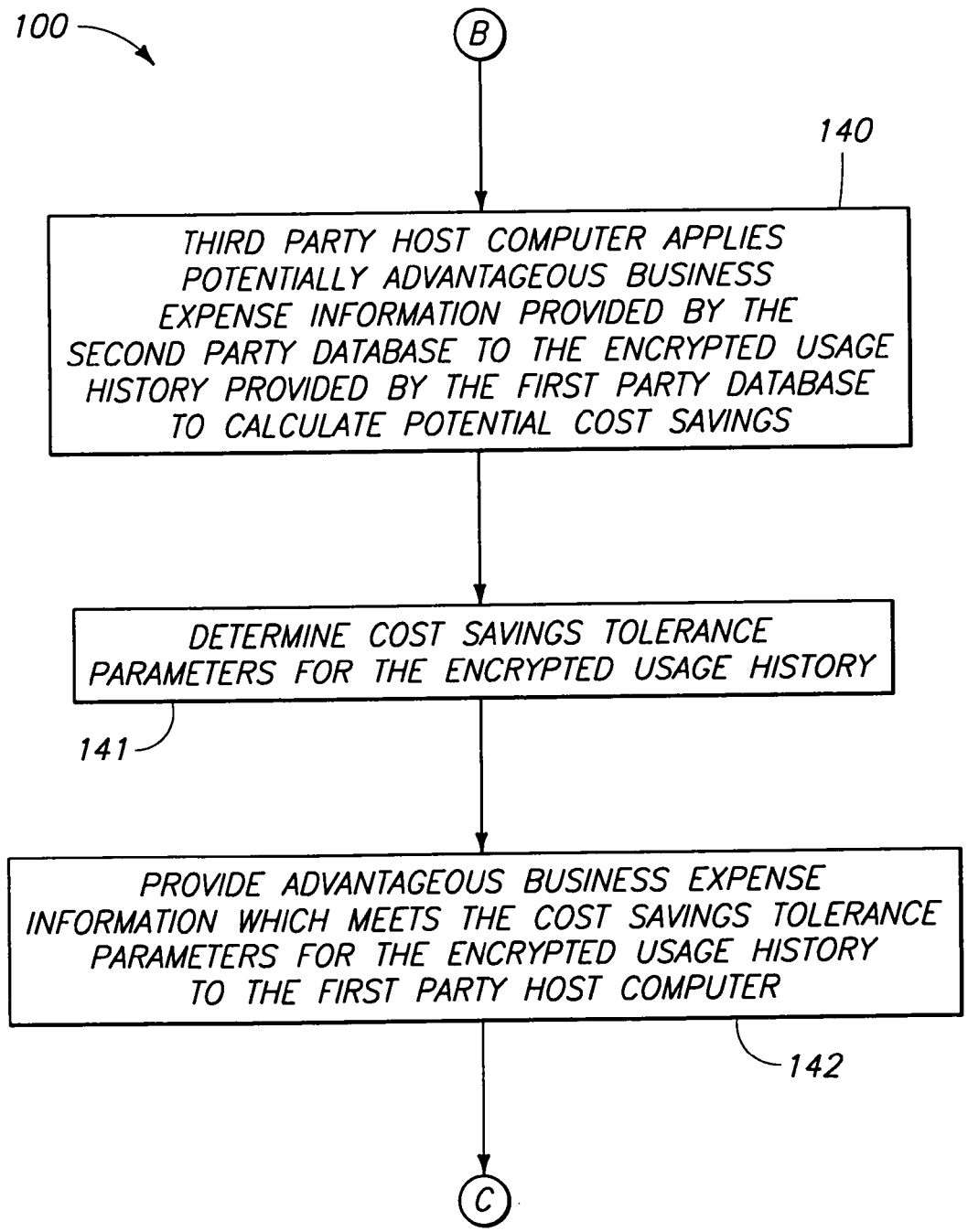

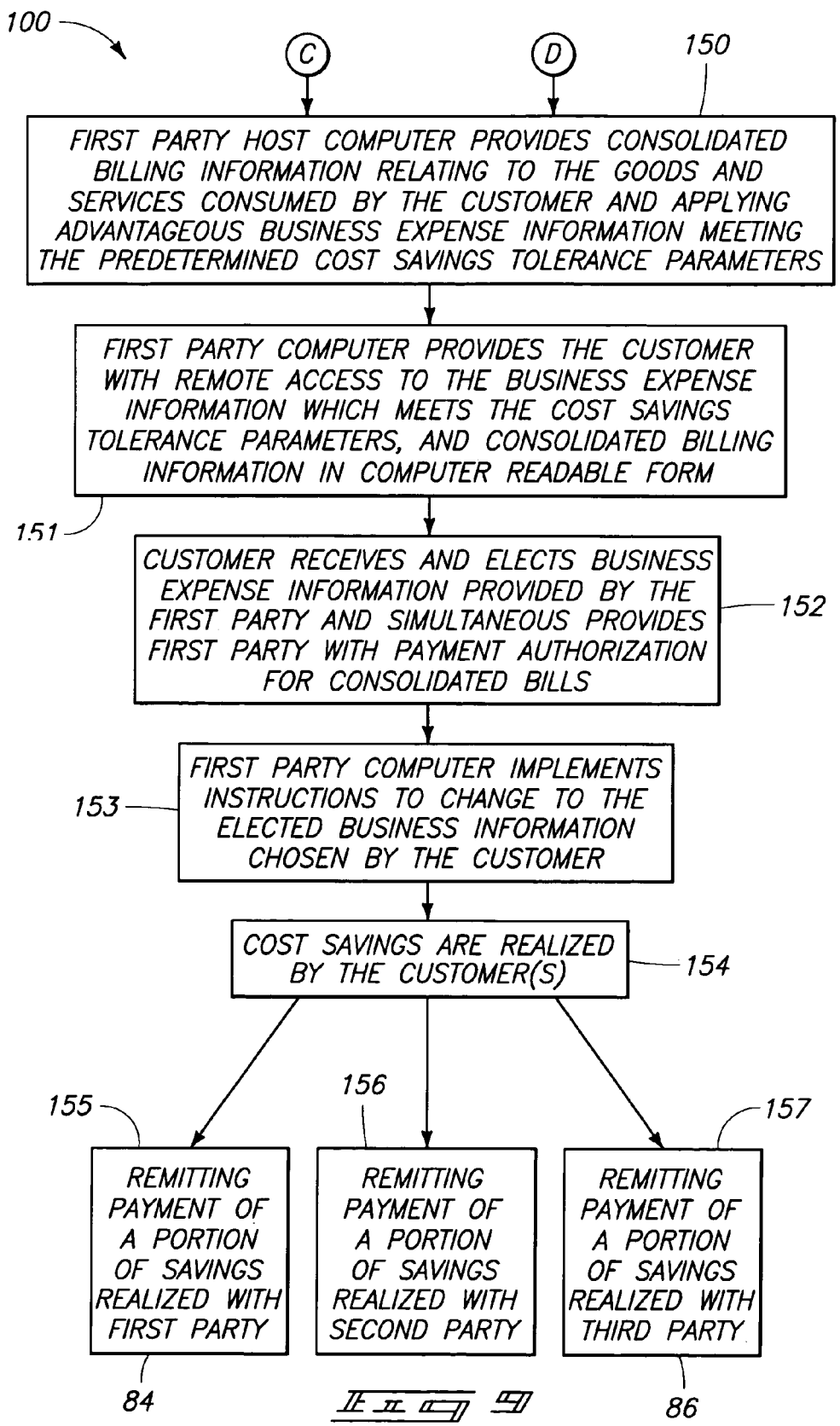

COMPUTERIZED SYSTEM AND METHOD FOR PROVIDING COST SAVINGS FOR CONSUMERS

TECHNICAL FIELD

This invention relates to a computerized system and method for providing cost savings for consumers, and more particularly to a method for fairly compensating parties for the sharing of advantageous business information which provides cost savings for the consumers of goods and services.

BACKGROUND OF THE INVENTION

In U.S. Pat. Nos. 5,930,773, 5,943,656, 6,035,285, 6,052,671 and 6,088,688, a computerized resource accounting method and system and an electronic bill presenting method and bill consolidating method were described. These methods and systems provide a management tool which permits a business owner having multiple sites to track and effectively manage resource use, and energy consumption in a particularly cost effective fashion. The patents noted above are incorporated by reference herein.

As discussed in the earlier patents, utility resources include, for example, electricity, gas (natural or petroleum based), water, sewer service and other types of services that may be provided by both private parties, municipalities and other governmental units. One type of consumer of utility services is the business owner who has a number of different geographically separated sites. Such customers or consumers typically purchase their resources from multiple unrelated resource providers. Those who have purchasing, decision making, and/or payment authority for these types of businesses typically face a burdensome task of tracking and maintaining resource consumption and use information. In addition to the problems encountered with tracking resource consumption for a variety of different business units in widely dispersed geographical areas, other problems present themselves in view of the new business environment presented by the deregulated energy markets. In view of the wide range of deregulated energy options now available, the task confronting decision makers can become even more onerous.

In the present deregulated energy market, many utility consultants now provide advice to various businesses regarding the proper selection of appropriate utility rates and other energy resources, that may be available for that business. In this regard, it should be appreciated that utility resources such as electricity, gas, water and other similar services are provided at various rates based upon such factors as the size of the business; the location of the business; and the rate of consumption. These factors may, of course, vary from location to location. Further, these factors, which are often characterized in utility rate schedules, and the like, are often difficult to understand or appreciate for those individuals who do not routinely operate in that industry segment. Still further, these rate schedules are often in a state of constant revision. Consequently, business managers do not explore the possible applicable utility rate schedules that are available and potentially applicable. In this deregulated utilities market, various consultants have developed businesses to provide advice regarding the proper utility rate selections.

In the deregulated environment where assorted consultants seek to provide advice to businesses regarding the proper selection of utility options, it will be seen that a business with widely geographically separated business units may be faced with meeting, and contracting with, multiple consultants in remote jurisdictions in order to achieve the best 11 utility cost savings for their business. This, of course, provides a new level of complexity and challenge for a business of this type, both in terms of the time commitment necessary to review the utility information provided by the consultant, and further to maintain contracts, and other relationships with the consultants over potentially long periods of time. Yet further, many businesses seek to avoid contractual relationships with consultants, and wish to be able to contract freely with respect to selecting new utility rates as business conditions change.

In addition to the foregoing difficulties encountered by businesses having remotely scattered operating units, utility rate consultants wish to be fairly compensated for the information provided and cost savings realized by the consumers. Yet further, they also wish to broaden the available customers to which they have access. As can be seen, the problems faced by a customer or consumer having multiple business sites are particularly troublesome in view of the nature of deregulated energy markets, multiple conflicting utility rate information, and assorted consultants who may have information which provides advantageous business opportunities, and attractive cost savings.

This invention arose out of concerns associated with improving the management tools available for assisting customers and other consumers in tracking and verifying bill accuracy, and for making utility resource and other purchasing decisions in an informed fashion.

SUMMARY OF THE INVENTION

A first aspect of the present invention relates to a computerized system and method for providing cost savings for utility users wherein the method comprises defining a data base in a host computer; storing in the database variable utility rate information from a plurality of utility providers; receiving into the host computer utility consumption information from a customer and determining an optimal utility rate from the utility rate information to provide cost savings to the customer; processing the utility consumption information and the optimal utility rate to provide usage-based, computer viewable data which is associated with the consumer's consumption of the utility; and providing the customer with computer access to the computer viewable data at a location which is remote relative to the host computer.

Another aspect of the present invention relates to a computerized system and method for providing cost savings for consumers and wherein the method may be utilized in connection with goods and services that are consumed by the consumer, and wherein these goods and services may comprise goods or services supplied by municipal and other governmental units.

Still another aspect of the present invention relates to a computerized system and method for providing cost savings to utility users comprising accumulating utility consumption history for at least one utility user by a first party; analyzing the utility consumption history against predetermined tolerance parameters by the first party; accumulating a plurality of utility rate schedules by a second party; analyzing the utility consumption history provided by the first party by utilizing the several utility rate schedules provided by the second party; subscribing the utility user to the utility rate schedule which provides cost savings to the utility user; and sharing a portion of the cost savings realized by the utility user between the utility user and the first and second parties.

Still another aspect of the present invention relates to the computerized system and method for providing cost savings for utility users comprising accumulating utility consumption history into a first database for at least one utility user by a first party, and wherein the first party assigns an identifier to the identity of the utility user and which relates to the utility consumption history stored in the first database; accumulating a plurality of utility rate schedules by a second party into a second database and wherein the first party transmits the utility consumption history bearing the identifier from the first database to the second database; analyzing in the second database the transmitted utility consumption history bearing the identifier with the utility rate schedules provided by the second party to determine potential cost savings to the utility user; reporting utility rate schedules which provide potential cost savings for the utility user's consumption history which has been analyzed by the first party; reporting to the utility user the utility rate schedules which provide potential cost savings by the first party; selecting utility rate schedules which provide advantageous cost savings by the utility user; and sharing a portion of the cost savings realized by the selection of the advantageous utility rate schedule between the utility user and the first and second parties.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 1 is a high level organization diagram illustrating another aspect of the present invention.

FIG. 2 is a high level organizational diagram illustrating another aspect of the present invention.

FIG. 3 is a high level organizational diagram illustrating another aspect of the present invention.

FIG. 4 is a high level organizational diagram illustrating another aspect of the present invention.

FIG. 5 is a high level organizational diagram illustrating another aspect of the present invention.

FIG. 6 is a high level organizational diagram illustrating another aspect of the present invention.

FIG. 7 is a high level organizational diagram illustrating another aspect of the present invention.

FIG. 8 is a high level organizational diagram illustrating another aspect of the present invention.

FIG. 9 is a high level organizational diagram illustrating another aspect of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

With reference to the present invention and as earlier discussed, the teachings of U.S. Pat. Nos. 5,930,773, 5,943,656, 6,035,285 6,052,671 and 6,088,688 are incorporated by reference herein.

With reference to the various systems and methodologies of the present invention as described hereinafter, aspects of the present invention are described in terms of steps executed or executable on or by a computer system. Although a variety of different computer systems can be used with the present invention, an exemplary computer system includes a host computer having a processor, a memory, a data storage device and an interface device. These exemplary components of a host computer are operably connected via an address/data bus which is not specifically designated in the drawings provided herein. The memory can and preferably does include a volatile memory (that is, random access memory) which is coupled with a data bus for storing information and instructions for the processor and a non-volatile memory (that is, the read only memory) coupled with a data storage bus for storing static information and instructions for the processor. The data storage device can comprise a mass storage device such as a hard or floppy disc drive, CD-Rom, tape drive, Zip™ drive, etc. The host computer constitutes a hardware platform which executes instructions to implement the application program described in the paragraphs which follow. It will be understood that the invention as hereinafter discussed is a schematic representation only. Accordingly, the system as described above and below can be implemented as an integral stand-alone system or can include separate component parts which are interconnected and operable for implementing the system described below. The interface device referenced above preferably comprises a multi-user network interface hardware, that is, for example, a network card and/or modem which couples the host computer to a multi-user system via a network, such as a local area network, wide area network, or the Internet. The Internet is used in only one embodiment of the present invention. The interface device is coupled to allow communication with various application programs contained on the hardware platform defined by the computer 11 system making up the host computer.

As discussed above, and in a preferred implementation of the present invention, the interface device which is coupled to the host computer comprises an Internet interface. The Internet is a well known connection of the world wide computer systems that operate using a well-known protocol (TCP/IP). The Internet is one type of multi-user computer system. Other Internet applications using other specific protocols operate on top of the Internet protocol. One such application is the well known world wide web or "www" Internet application which operates using the hypertext transfer protocol or HTTP. The hypertext transfer protocol is a "demand" system in which a user requests information from a site and the site transfers the information back to the user on-line. Also well known is the e-mail internet application which operates using the simple mail transport protocol (SMTP) or the point-to-point protocol (PPP). The e-mail internet application is a "present" system in that an information transfer command originates from a sender site and information pursuant to that command is presented to the target e-mail address. Another internet application is the file transfer internet application which operates using the file transfer protocol (FTP). In one embodiment, the system utilizes one or more of the www, e-mail and file transfer internet applications as well as the internet protocol. Other embodiments of the present invention can be implemented in other multi-user computer environments. For example, the present invention could be implemented with a dedicated multi-user system.

The computer system and methodology which will be discussed hereinafter supports a software configuration which operates under the control of a conventional operating system. The operating system permits various application processes to be executed. These include, for example, a communications application which permits data transfer with various remote terminals as will become apparent below. The software environment further includes a data management storage and retrieval application that is utilized in connection with a data storage device. The data management storage and retrieval application organizes and stores information which will be described in greater detail below. This information is organized and stored within the environment of the operating system on one or more mass storage devices. Other applications conventionally known may be included in the software environment comprising the computer system.

In view of the foregoing computer system description and in accordance with one aspect of the invention, attention is directed to FIG. 1 where an exemplary schematic diagram illustrating several aspects of the present invention is shown.

As noted above, the teachings of U.S. Pat. Nos. 5,930,773; 5,943,656; 6,035,285; 6,052,671; and 6,088,588 are incorporated by reference herein.

First Form of the Invention

In the first form of the invention which is generally indicated by the numeral 10 and which is illustrated in FIGS. 1–5, it will be seen that the present invention relates to a computerized system and method which allows a consumer or customer of utility services 11 to account for the use of any consumable resource such as electricity; gas; oil; telecommunications; transportation; manufacturing; leases; and manufacturing and repair services, to name but a few. Throughout the present application, the terms consumer; customer; user; and utility user are used interchangeably and refer to a consumer of utility services, or goods and other resources. As seen in FIG. 1, the present computerized system and method allows for a number of different customers 11 to have remote data access to a first party host computer which will be discussed below. Yet further, a plurality of resource and utility providers are generally indicated by the numeral 12. This plurality of resource and utility providers also have remote data access to a first party host computer 13. The host computer has a processor and an interface device as earlier described. As seen in FIG. 1, a database 14 is defined within the first party host computer 13. Within that same database, business information peculiar to the individual customers 11 is collected or stored 15 by a first party. The first party in this example is a business that provides consolidated billing and resource accounting services which are utilized by the respective customers 11. As discussed above, the customer 11 is a consumer of a utility or other resource for which it desires to manage and account. This particular customer information 15 includes, among other things, the identity of the customer; the customer's various locations and address information; business contacts; and other accounting information which is peculiar to the particular customer in question. All the customer information is normally considered to be trade secret information. Additionally, non-customer specific utility and resource information 20 is also collected and stored in the database 14. In this regard, this information is collected by the first party from the data information supplied by the respective resource and utility providers 12.

Referring still to FIG. 1, it will be seen that the computerized system and method for providing cost savings for customers or utility users 11 of the present invention 10 further includes a step of accumulating and storing in the first party data base, resource and utility provider information collected by the first party and which relates to the billing information such as utility consumption information regarding each customer 21. This is supplied from the resource and utility providers 12. Yet further after the step of storing in the first party database the customer billing information 21 collected by the first party, the system and method further includes the step of processing the previous utility consumption information to provide historical billing data related to the utilities and resource consumption by the customer 22. In this regard step 22 includes a further step of processing historical billing data which includes the utility consumption information from each customer stored in the database 14 to define predetermined tolerance parameters for the utility consumption information for each customer 23. Yet further, step 22 includes performing an audit of the current resource and utility billing information relating to the customer against the predetermined tolerance parameters to determine whether the utility consumption information satisfies the predetermined tolerance parameters 24. More specifically, step 22 includes a first step of defining tolerance parameters for each customer 23, and thereafter checking the resource and utility billing information against the tolerance parameters 24. Yet further, the system and method of the present invention further includes a step of processing the current utility consumption information provided by the resource and utility providers 12 to establish a usage history meeting the tolerance parameters 25. At this juncture, an anonymous or encrypted identifier is assigned to protect the customer's identity. The encrypted identifier is used to identify the usage history 25 of the utility user 11, when this usage history is stored in step 26. As noted above, during step 22 as seen in FIG. 1, the system and method 10 includes a step wherein recent utility consumption information received from the resource and utility providers 12 is processed against the predetermined tolerance parameters 23 to establish a utility consumption history which meets the predetermined tolerance parameters 25 or is otherwise deemed valid. Step 22 is utilized in an attempt to identify resource and utility consumption patterns which should be reviewed in closer detail by the customer 11 to determine possible inaccuracies of the resource and utility billing information provided by the resource and utility providers 12, or to identify potentially wasteful business practices which need attention. As noted above, the step shown at numeral 26 for storing the encrypted usage history meeting the tolerance parameters includes providing an encrypted identifier to the corresponding usage history which meets the tolerance parameters 25 in the first party host computer and which effectively prevents other parties from gaining access to the identification of the customer. This facet of the invention will be discussed in greater detail hereinafter.

As seen in FIG. 2, a second party host computer 30 is provided. The second party, who uses computer 30, will normally be a utility rate consultant, often termed a "rate hawk". These are individuals who seek to sell utility rate information to the customers 11. Of course, other third parties dealing in other resources may also utilize the present invention. The methodology of the invention 10 further provides a step of forming or defining a database 31 in the second party computer 30, and storing in the second party database utility and resource rate information 32 such as a plurality of variable utility rate information or schedules which relates to a plurality of utility providers 12, and which is accumulated by the second party.

The second party also prepares computer readable templates which summarize the utility and/or resource rate information or schedules collected by the second party as represented in the step labeled 33. The second party host computer 30 has an access device wherein the second party computer 20 is selectively coupled in data exchanging relation to the first party host computer 13, and wherein the second party computer cannot gain access to the customer identifying or business information 15 which is stored in the database 14. Also in the present invention, the first party cannot gain access to the plurality of variable utility and resource rate information or schedules 32 which are stored in the second party database 31. Still further, the second party host computer 30 is selectively coupled in data exchanging relation with a third party host computer 50 which will be discussed in greater detail hereinafter.

As seen in FIG. 2, utility and resource providers 12 have a host computer generally designated by the numeral 40. Within the host computer 40 a database 41 is defined and which stores a plurality of variable utility and resource rate information or schedules which are generally indicated by the numeral 42. In a fashion similar to that previously described with respect to the second party host computer 30, the utility and resource providers 12 prepare computer readable templates, tables, or display data 43 which summarize the variable utility rate schedule or resource information 42 which has been collected by the utility and resource providers 12. The utility and resource provider's host computer 40 is selectively coupled in data exchanging relation with a third party host computer which is generally designated by the numeral 50. As seen in FIG. 2, the third party host computer is similar in its overall configuration with respect to the first and second party host computers 13, 30 inasmuch as the third party host computer has a processor, a data storage device and an access device which allow the third party host computer 40 to remain in data exchanging relation with the other host computers noted above. As seen in FIG. 2, the third party host computer thereafter has a number of databases defined therein, that is, a first party database 51; a second party database 52; a third party database 53; and a utility and resource provider's database 54. These individual databases are operable to receive and store information which has been collected by the first, second and third parties and the utility and resource providers for the purposes which will be described in greater detail hereinafter. As should be understood, the third party host computer 50 may comprise an automated clearing house established by the third party for the purpose which will be described below.

Referring now to FIG. 3, it will be seen that the first, second and third databases 51, 52 and 53 and the utility and resource providers database 54, in operation, are coupled in data exchanging relation with the third party host computer 50. The third party host computer thereafter utilizes the information in the several databases and further identifies and applies the identified advantageous utility and resource information provided by the second party database; and utility rate schedule information provided by the utility and resource provider's database to the encrypted usage history provided by the first party database 51 to calculate potential cost savings at the step labeled 60. As should be understood, the information contained in the first party database 51 contains only the utility consumption information meeting the tolerance parameters earlier established at step 23, and the identification of the customer 11 is encrypted. Subsequently, and as seen at step 61, the methodology of the present invention further comprises determining a cost savings tolerance parameter for the encrypted usage history and which includes the consumer's utility consumption information. As should be appreciated, the present methodology provides a means by which not all cost savings are utilized or reported, but rather only those which provide cost savings which fall within a given predetermined range. For example, some potential cost savings may be so minor that the cost of taking advantage of same may impact adversely the business in other respects. In other instances, the related costs of subscribing to the particular rate schedule 42 may also be cost prohibitive.

Following the determination of the cost savings tolerance parameters for the encrypted usage history at step 61, the methodology of the present invention at step 62 includes providing the identified advantageous utility, resource, and rate information which meets the predetermined cost savings tolerance parameter for the encrypted usage history to the first party host computer 13. A record of this information which is transmitted to the first party host computer 13 is maintained by the third party host computer 50.

Referring now to FIG. 4, and following the step of providing the identified advantageous utility and resource and rate information to the first party host computer at step 62, the first party host computer 13 then provides consolidated billing information relating to the utilities or resources consumed by the customer or consumer 11, and also applies the identified advantageous utility and resource information which meets the predetermined cost savings parameter 61 as previously established 70. Subsequently, and as seen in FIG. 4 and at step 71, the first party host computer 13 provides the customer or consumer 11 with remote access to the identified utility and resource rate information or schedules 42 which meet the cost savings tolerance parameters at step 61; the customer business information 15, and the noncustomer specific utility and resource information 20 in computer readable form, along with consolidated billing information which was earlier collected and assembled during step 22 and stored as encrypted usage history in step 26. In one embodiment, only the billing information meeting the predetermined tolerance parameters are reported. That information which does not meet the tolerance parameters is then flagged or otherwise identified for separate treatment. Referring now to FIG. 5, once the customer or consumer 11 is provided with remote access at step 71, the customer will receive and review the plurality of variable utility and resource rate information or schedules 42 as provided by the first party and will elect a resource rate that meets their business needs. Thereafter, in one embodiment, the customer simultaneously provides the first party with payment authorization for the consolidated bills presented at step 80. Once the payment authorization for the consolidated bills is provided at step 80, the first party computer 13 implements utility and resource rate instructions to change the utility or resource rate with the identified utility or resource provider and which is selected by the customer at step 81. Thereafter, the first party renders payment to the utility provider as identified in the consolidated bills at step 82, and thereafter, cost savings are realized by the customers at step 83. In this particular methodology, a portion of the savings realized by the customer is shared or otherwise remitted in a payment to the first party 84, second party 85 and third party 86. In this arrangement, the utility rate consultants providing advantageous utility and resource information are fairly compensated for the information provided. Still further, the third party automated clearing house providing the third party host computer 50 receives a fee for the services provided, and the first party providing the encrypted resource information permits their customers to realize cost savings not possible heretofore, while simultaneously earning a fee for the services rendered.

In summary, therefore, the first form of the invention 10 as seen in FIGS. 1–5 is a computerized system and method for selecting an appropriate utility rate to provide cost savings for a consumer 11 comprising defining a database 14 in a first computer 13; receiving in the database 14 previous utility consumption information relating to the consumption of the utility by a customer at step 21; processing the previous utility consumption information to provide historical billing data 24 relating to the consumption of the utilities by the customer 11; processing the historical billing data stored in the database 14 to provide predetermined tolerance parameters at step 23 which are related to the historical billing data; storing in the database 14 customer 11 information which includes historical billing data relating to the recent consumption of a utility by a utility customer, the recent utility information having various portions at step 26; performing an audit by means of step 22 of the recent utility consumption information against the predetermined tolerance parameters to determine whether the recent utility consumption information satisfies the tolerance parameters 23; determining a cost savings tolerance parameter for the customer at step 61; defining a second database 51–54 in a second computer 50; receiving into the second database 51–54 utility rate information 32 which relates to a plurality of utility providers 12; receiving into the second database 51–54 the selected portions of the recent utility consumption information relating to the customer and which was stored at step 26 and which satisfies the predetermined historical tolerance parameters, and processing the received utility consumption information to determine potential cost savings to the customer 60; providing utility rate information which meets the predetermined cost savings tolerance parameters for the selected portions of the utility consumption information at step 62 to the database 14, and wherein the respective computers cannot gain access to all the customer information 15 which is stored in the database 14; receiving into the database 14 the utility and resource rate information 32 which meets the predetermined cost savings tolerance parameters as calculated at step 62, and processing the utility consumption information and the utility rate information to provide usage-based computer viewable data which is associated with the customers' consumption of the utility at step 71; providing the customer 11 with computer access to the first computer 13 to view the computer viewable data produced at step 71 at a location which is remote to the first computer 13, and wherein the customer 11 views the computer viewable data related to the consumption of the utility or resource, and selects a utility rate which meets their needs; and calculating a percentage of the cost savings provided to the customer 11 by the selection of the utility rate, and retaining and sharing a portion of the cost savings as an earned fee between the parties 84, 85 and 86 as provided for in step 83. It should be recognized that in certain circumstances, the customer 11 may elect that the first party select an appropriate utility rate based upon standing instructions or oral instructions given by the customer 11.

Second Form of the Invention

The second form of the invention is generally designated by the numeral 100 and the various aspects of the invention can be seen in FIGS. 6–9 respectively. As will be seen, the second form of the invention is very similar to the first form of the invention 10, however, the methodology of the second form of the invention is directed to a computerized system and method of providing cost savings for consumers of goods and services. In this regard, a plurality of individual customers or consumers are generally designated by the numeral 101, and a plurality of diverse, goods and services providers are generally indicated by the numeral 102. As should be understood, the goods and services comprise any good or service which can be consumed by a customer 101 and may include such services as maintenance and repair, leasing, telecommunications access and utilization, and governmental and municipal services to name but a few. In the case of governmental and municipal services, it should be understood that many municipalities have defined various geographical areas where, if a business locates in that particular area, they will be given a favorable tax and/or other treatment. This of course encourages the businesses to locate in economically distressed areas. Such tax and other incentives, can provide advantageous business opportunities for various businesses. Consequently, such information is treated and considered within the methodology of the present invention 100.

Second Form of the Invention

The second form of the invention is generally designated by the numeral 100 and the various aspects of the invention can be seen in FIGS. 6–9 respectively. As will be seen, the second form of the invention is very similar to the first form of the invention 10, however, the methodology of the second form of the invention is directed to a computerized system and method of providing cost savings for consumers of goods and services 400. In this regard, a plurality of individual customers are generally designated by the numeral 101, and a plurality of diverse, goods and services providers are generally indicated by the numeral 102. As should be understood, the goods and services comprise any good or service which can be consumed by a customer 101 and may include such services as maintenance and repair, leasing, telecommunications access and utilization, and governmental and municipal services to name but a few. In the case of governmental and municipal services, it should be understood that many municipalities have defined various geographical areas where, if a business locates in that particular area, they will be given a favorable tax and/or other treatment. This of course encourages the businesses to locate in economically distressed areas. Such tax and other incentives, can provide advantageous business opportunities for various businesses. Consequently, such information is treated and considered within the methodology of the present invention 100.

As seen in FIG. 6, the methodology of the present invention 100 includes providing a first party host computer 103 and defining a database 104 therein. The first party host computer 103 is coupled in data exchanging relation with the plurality of customers 101 and goods and services providers 102. As will be seen, from FIG. 6, a first party having the first party host computer 103 will collect and store the customer's 101 business information at a step 105 in the database 104. The customer's business information may include all the information previously disclosed with respect to the first form of the invention 10. Yet, further, the goods and services providers 102 also will provide to the first party host computer 103 an appropriate data stream comprising billing information regarding each of the customers 101 as seen at step 110.

As discussed above, with respect to the first form of the invention 10, and as disclosed in significant detail in the earlier patents which have been incorporated by reference herein, the methodology of the present invention 100 provides an audit process at step 111, against which the billing information of each customer 101 and which is collected at step 110, may be compared and contrasted to determine deficiencies or irregularities in same.

In one aspect of the invention 100, the audit process which is conducted at step 111 is preferably implemented in a suitable software application which is resident upon the hardware platform defined by the first party host computer 103. The audit process as defined by step 111 includes a definition step 112 wherein at least one and preferably more predetermined tolerance parameters are defined for each of the customers 101. At step 113, the goods and service providers billing information received in step 110 is checked against the predetermined tolerance parameters for determining whether the billing information satisfies such parameters. If the billing information does not satisfy the predetermined tolerance parameters, then in the course of one aspect of the invention, remote access to that particular nonconforming billing information can be denied to the customer 101. If the billing information does not satisfy one of the tolerance parameters, it is identified or otherwise flagged for further consideration. Such billing information can be subjected to suitable remedial processing measures, either manually or electronically to insure that such billing information is accurate. In the implementation of the second form of the invention 100 as shown in FIG. 6, the predetermined tolerance parameters defined through the utilization of historical billing data is established for the customer 101 at step 112. Additionally, the historical billing data can include currently up-to-date billing information from the current billing cycle. The first party host computer 103 processes the historical billing data and defines the usage history meeting the tolerance parameters at step 114.

Two exemplary categories of tolerance parameters established in step 112 and which can be utilized with the billing information received from the goods and services providers at step 110 are [1] overall bill tolerance check parameters; and [2] individual line item tolerance check parameters. Of course, other tolerance parameters are possible. Examples of overall bill tolerance check parameters include: [a] current charges cannot exceed one and one-half times the average bill; [b] bills cannot overlap with any other system bill with respect to beginning and ending dates; [c] the bill cannot be duplicated within the system; and [d] all required information must be present on the entered bill. Examples of individual line item tolerance check parameters include: [a] the number of days of a service must fall within 20% either way of the account average; [b] service start date must be the day following the prior bill period ending date; [c] service end date must be one day prior to the next period beginning date; [d] service consumption and dollars must move in the same general direction, that is, an increase in one should be accompanied by an increase in the other; [e] consumption must fall within a 20% difference of the prior or next period consumption; and [f] charges must fall within a 20% difference of prior or next period charges. A bill or billing information provided by the goods and services providers 102 failing any of the above parameters is flagged or otherwise identified for subsequent remedial processing. As history of a particular customer 101 is accumulated, tolerances can be redefined based upon the actual variances that exist between months and/or billing periods. Accordingly, the predefined tolerance parameters 112 are adjustable by the system for each customer 101, in one embodiment.

The auditing process as defined by step 111 is a dynamic and ongoing process. Therefore the present methodology 100 permits the first party host computer 103 to present only consolidated billing data which appears to be accurate in all respects.

Assuming that the goods and service providers 102 billing information 110 meets the auditing process as defined, and conducted pursuant to step 111, and the predetermined tolerance parameters 112 as established for each customer 101, then in that event, the customer 101 usage history meeting the tolerance parameters as established in step 114 is stored and assigned an encrypted identifier at step 115. This prevents the identification of the customer's identity as provided in the database 104. As earlier discussed, the present methodology 100 is arranged in such a fashion so as to substantially prevent the identification of the customer 101, if at all possible, thereby preventing utility rate consultants and/or others from circumventing the present methodology and going directly to the customer 101 to provide their services without fairly compensating the first party who provides the first party host computer 103 which contains the customer business information 105 and the goods and service information as described above and which is provided by the providers 102.

Referring now to FIG. 7, a second party host computer is provided at step 120. Defined within the second party host computer 120 is a database 121. The second party who provides the second party host computer 120 normally is a consultant having information relating to the goods and services provided by the goods and services providers 102. These individuals may be business consultants, or others having advantageous business information which may be of value to the respective customers 101. The second party thereafter stores in the database 121 variable, potentially advantageous, business expense information directed to the goods and services supplied by the goods and services providers 102 at step 122. The information provided by these second party consultants may comprise as earlier noted, any information relating to the goods and services consumed by the customer 101. Following step 122 of storing the variable potentially advantageous business expense information, the second party will at step 123 prepare a computer readable template summarizing the advantageous business expense information. Thereafter, the second party host computer 120 is coupled in data exchanging relation with a third party host computer which is generally indicated by the numeral 130.

The third party host computer 130 as earlier discussed, comprises an automated clearinghouse. However, it is conceivable that the third party host computers and the third party providing same, may also provide potentially advantageous business expense information directed to the goods and services supplied by the goods and services providers 102. Likewise, the third party providing the third party host computer at step 130, may also provide computer readable templates as indicated at step 123 summarizing such additional information. As noted in FIGS. 6 and 7, the first party host computer 103 is coupled in data exchanging relation with the third party host computer 130 in order to supply the encrypted usage history meeting the tolerance parameters as seen in step 115. Thereafter, the third party host computer 130 defines first, second and third party databases 131, 132 and 133 respectively which receive the respective information of the first, second and third parties.

Referring now to FIG. 7, the third party host computer 130, which may operate as an automated clearinghouse, applies potentially advantageous expense information provided by the second party database 121 to the encrypted usage history provided by the first party database as provided in step 115 to calculate potential cost savings at step 140 (FIG. 8). Once the third party host computer 130 applies this information and calculates potential cost savings, the methodology of the present invention further includes a step of determining cost savings tolerance parameters for the encrypted usage history 115 at 141. As discussed earlier, not every potential cost savings that could be realized by the customer 101 is reported to same. As discussed above, such cost savings, might be quite minimal or in the alternative, there may be added expenses to the business in adopting such cost savings beyond that realized by the savings itself. In any event, a cost savings tolerance parameter is established at step 141. In one embodiment, of the invention, cost savings falling below that tolerance parameter established in step 141 are not reported to the customer 101. After step 141 of determining the cost savings tolerance parameters for the encrypted usage history 115, the methodology further includes a step 142 of providing the advantageous business expense information which meets the cost savings tolerance parameters 141 for the encrypted usage history 115 to the first party host computer 103. As was the case with the first form of the invention 10, the first and second parties are precluded from gaining access to information stored in either the first party database 104 or the second party database 121 which would allow them to utilize the information of same without fairly compensating the party which has collected that particular information. As will be recognized, the third party clearinghouse as provided for at step 130 provides a safeguard whereby the respective parties may supply their valuable information without risk of not being fairly compensated for the use of same.

Referring now to FIG. 9, the methodology of the present invention 100 at step 150 provides that the first party host computer 103 consolidate the billing information relating to the goods and services consumed by the customer 101, and further apply the advantageous business expense information meeting the predetermined cost savings tolerance parameters as established at step 141. As seen in step 151, the first party computer 103 provides the customer 101 with remote access to the business expense information which meets the cost savings tolerance parameters previously established at step 141. Thereafter, the first party computer 103 allows the customer 101 to remotely access and view consolidated billing information in computer readable form at step 151. This information will include the business expense information meeting the cost savings tolerance parameters as established in step 141. As seen in step 152, the customer 101 receives and elects the business expense information provided by the first party and simultaneously provides the first party host computer 103 with payment authorization for the consolidated bills provided. As will be seen in FIG. 9, the methodology 100 further includes, following the receipt of an election of the business expense information and the viewing of the consolidated bills by the customer 101 at step 152, that the first party computer 103 implement instructions to change to the elected business information chosen by the customer at step 153. As with the first form of the invention 10, cost savings are realized by the customer at step 154, and a calculation is performed to determine a portion of the savings which will be shared with the first, second and third parties as seen at 155, 156 and 157 respectively. A portion of the savings realized are remitted to the first, second and third parties.

In summary, therefore, the computerized system and method 100 for providing cost savings for consumers or customers 101 of goods and services comprise accumulating a goods and services consumption or usage history 114 into a first database 104 for at least one customer 101 by a first party, and wherein the first party assigns an encrypted identifier to the identity of the customer 101 and which relates to the goods and services consumption history stored in the first database as established at step 115; accumulating variable, potentially advantageous business expense information at step 122 by a second party into a second database 132, and wherein the first party transmits the goods and services consumption history bearing the encrypted identifier 115 from the first database 131 to the second database 132; analyzing in the second database 132 the transmitted goods and services consumption history bearing the encrypted identifier established at step 115 with the variable potentially advantageous business expense information supplied by the second party to determine potential cost savings for the customer at step 140; providing or reporting the advantageous business expense information which provides potential cost savings for the customers' goods and services consumption history at step 142; reporting to the customer the business expense information which provides potential cost savings by the first party at step 151; selecting the business expense information which provides advantageous cost savings by the customer at step 152; and sharing a portion of the cost savings realized by the selection of the advantageous business expense information between the customer and the first, second and third parties 155, 156 and 157, respectively.

Operation

The operation of the described embodiments of the present invention are believed to be readily apparent and are briefly summarized at this point. Referring now to FIGS. 1–5, and the first form of the invention, a computerized system and method for providing cost savings for utility users 10 is shown, and which includes, defining a database 51–54 in a host computer 50 having a processor and an interface device; storing in the database 51–54 variable utility rate information 32 from the plurality of utility providers 12; receiving into the host computer 50 utility consumption information from a customer 11 established at step 26 and determining an operable utility rate for the utility rate information to provide cost savings for the customer at step 60; processing the utility consumption information and the optimal utility rate 60 to provide usage-based computer viewable data which is associated with a consumer's consumption of the utility at step 71; and providing the customer 11 with computer access to the computer viewable data through the interface device, and wherein the customer can view computer viewable data at a location which is remote relative to the host computer 50.

More specifically in the first form of the invention, the computerized system and method for providing cost savings for utility users 10 includes at step 21 accumulating utility consumption history for at least one utility user 11 by a first party; analyzing the utility consumption history at step 24 against predetermined tolerance parameters established at step 23 by the first party; accumulating a plurality of utility rate schedules at steps 32, and 42, by a second party; analyzing the utility consumption history established at step 26, and which is provided by the first party by utilizing the several utility rate schedules provided by the second party and as done at step 60; subscribing the utility user 11 to the utility rate schedule which provides cost savings for the utility user at step 81 and at step 83 sharing a portion of the cost savings realized by the utility user 11 between the utility user 11 and the respective first, second and third parties as provided in steps 84–86 respectively.

In the second form of the invention, as seen in FIGS. 6–9, the computerized system and method for providing cost savings for consumers of goods and services 100 includes defining a database at steps 131 to 133 in a host computer 130 having a processor and an interface device. Storing in the respective databases 131 through 133 variable business expense information from a plurality of goods and services providers in a step 122; receiving into the host computer 130 goods and services related consumption information established at step 115, and determining an optimal business expense from the variable business expense information to provide cost savings for the customer at step 140; processing the optimal business expense information and the goods and services consumption information at step 150 to provide usage-based computer viewable data which is associated with the customers' 101 consumption of the goods and services at step 151; and providing the customer 101 with computer access to the computer viewable data at step 151, and wherein the customer 101 can view the computer viewable data at a location which is remote relative to the host computer 130.

Therefore, it will be seen that the present invention provides a convenient methodology whereby a customer, at a remote site, can review and ascertain the billing charges for the resources or other utilities which they have consumed and thereafter authorize payment for those services. Further, the methodology as expressed in the several forms of the invention provides a convenient means by which a customer can select new utility and resource providers to provide advantageous cost benefits to their business. As will be recognized, this methodology is extremely useful for customers having multiple remote business sites which are serviced by a multiplicity of different resource and utility providers. The methodology of this invention also provides an interactive, convenient, and easy-to-use billing, accounting and resource accounting system which allows a customer with numerous sites to ascertain in a relatively quick fashion critical business information in a consolidated and concise format.

In compliance with the statute, the invention has been described in language more or less specific as to its methodical features. It is to be understood, however, that the invention is not limited to the specific features shown described since the means herein disclosed comprise the first forms of putting the invention into effect. The invention is therefore claimed in any of its forms or modifications within the proper scope of the appended claims appropriately interpreted in accordance with the Doctrine of Equivalents.

The invention claimed is:

1. A computerized method for selecting an appropriate utility rate to provide cost savings for a consumer, comprising:
   defining a first database in a first computer;
   storing in the first database consumer information collected by a first party, and wherein the consumer consumes a utility for which it desires to manage and account;
   receiving in the first database utility consumption information relating to the consumer and which is collected by the first party, and whereas the utility consumption information has various portions;
   analyzing the utility consumption information of the consumer against predetermined tolerance parameters by the first party and determining whether the utility consumption information satisfies the predetermined tolerance parameters;
   defining a second database in a second computer, and wherein the second computer is coupled in data exchanging relation relative to the first computer;
   receiving into the second database from a second party a plurality of utility rate information which relates to a plurality of utility providers;
   receiving into the second computer selected portions of the utility consumption information relating to the consumer, and which satisfies the predetermined tolerance parameters, and processing the received utility consumption information by analyzing the utility consumption history relative to the utility rate information to identify a utility rate which provides potential cost savings to the consumer based upon the selected portions of utility consumption information which meets the predetermined tolerance parameters, and wherein the second computer cannot gain direct access to all of the customer consumer information stored in the first database, and the first computer cannot gain access to the utility rate information stored in the second database;
   receiving into the first computer the identified utility rate which provides the consumer with potential cost savings, and processing the utility consumption information which meets the predetermined tolerance parameters and the identified utility rate to provide usage-based, computer viewable data which is associated with the consumer's consumption of the utility and which is related to the identified utility rate;
   providing the consumer with computer access to the first computer to view the computer viewable data at a location which is remote relative to the first computer, and wherein the consumer views and considers the computer viewable data related to the consumption of the utility which is associated with the identified utility rate, and then affirmatively selects the identified utility rate which meets their needs; and
   establishing a compensation for the first and second parties for acting on the behalf of the consumer to provide the cost savings realized by the consumer by the affirmative selection of the identified utility rate, and wherein the consumer remits to the first and second parties a portion of the realized cost savings from affirmatively selecting the identified utility rate which provides cost savings.

2. A computerized method as claimed in claim 1, and wherein before the step of analyzing the utility consumption information, the method further comprises:
   establishing predetermined tolerance parameters by the first party for analyzing the utility consumption information.

3. A computerized method as claimed in claim 1, and wherein the step of establishing a compensation for the first and second parties, further comprises:
   retaining and sharing a portion of the cost savings realized as an earned fee between the first and second parties.

4. A computerized method for selecting an appropriate utility rate to provide cost savings for a consumer, comprising:
   defining a database in a host computer;
   providing a first party database in a first party computer;
   accumulating and storing in the first party database utility consumption information previously collected by the first party, and which relates to the previous utility consumption by a consumer;
   processing the previous utility consumption information to provide historical billing data relating to the utility consumption by the consumer;
   processing the historical billing data stored in the first database to provide predetermined tolerance parameters for the utility consumption information of the consumer;

performing an audit of the utility consumption information relating to the consumer against the predetermined tolerance parameters to determine whether the utility consumption information satisfies the predetermined tolerance parameters;

accumulating a plurality of variable utility rate information from a plurality of utility providers;

storing in the database of the host computer the variable utility rate information from the plurality of utility providers;

receiving into the host computer the utility consumption information relating to the consumer and identifying a utility rate from the plurality of variable utility rate information that provides cost savings to the consumer;

processing the utility consumption information and the identified utility rate to provide usage-based, computer viewable data which is associated with consumer's consumption of the utility; and providing the consumer with remote access to the computer viewable data, and wherein the consumer can view the computer viewable data at a remote location relative to the host computer, and further affirmatively acts upon the computer viewable data to select the identified utility rate which provides cost savings to the consumer.

5. A computerized method as claimed in claim 3, and wherein after the step of receiving into the host computer the utility consumption information of the consumer, and before the step of processing the utility consumption information and the identified utility rate to provide use-based computer viewable data, the method further comprises:

determining a cost savings tolerance parameter for the consumer.

6. A computerized method as claimed in claim 5, and further comprising:

providing a second party database in a second computer, and wherein the plurality of variable utility rate information which relates to the plurality of utility providers, is accumulated by a second party and stored in the second party database, and wherein the second computer is coupled in data exchanging relation relative to the host computer, and wherein the first party computer cannot gain access to the plurality of variable utility rate information stored in the second party database, and the second party computer cannot gain access to the customer consumer's utility consumption information stored in the first party database.

7. A computerized method as claimed in claim 6, and wherein the second party collecting the plurality of variable utility rate information is a utility rate consultant.

8. A computerized method as claimed in claim 6, and further comprising:

preparing computer readable templates by the second party and which summarize the plurality of variable utility rate information collected by the second party; and providing the computer readable templates prepared by the second party to the host computer.

9. A computerized method as claimed in claim 8, and wherein the step of receiving into the host computer the utility consumption information relating to the consumer further comprises:

removing the consumer's identity and assigning an encrypted identifier to the consumer, and which now relates to the utility consumption history of the consumer stored in the first database; and providing the utility consumption information bearing the encrypted identifier to the host computer, and wherein the second party computer cannot gain access to the consumer's identity stored in the first database.

10. A computerized method as claimed in claim 9, and wherein the step of processing the utility consumption information and the identified utility rate to provide usage-based computer viewable data further comprises:

processing the identified utility rate information which meets the predetermined tolerance parameters for the utility consumption history information bearing the encrypted identifier.

11. A computerized method as claimed in claim 10, and wherein the step of providing the consumer with remote access to the computer viewable data further comprises:

allowing the consumer's agent to select the identified utility rate which meets the consumer's needs;

after the step of selecting the identified utility rate, calculating a percentage of the cost savings experienced by the consumer as a result of the selection of the identified utility rate, and retaining and sharing a portion to the cost savings as an earned fee between the first party and the second party.

12. A computerized method as claimed in claim 11, and wherein the host computer is an automated clearing house provided by a third party, and wherein the earned fee is also shared with the third party.

13. A computerized method as claimed in claim 12, and wherein the utility consumption information relates to the usage of consumable resources and services.

14. A computerized method for selecting an appropriate utility rate to provide cost savings for a consumer, comprising:

accumulating a utility consumption history for at least one consumer by a first party;

analyzing the utility consumption history against predetermined tolerance parameters by the first party;

accumulating a plurality of utility rate schedules by a second party;

analyzing the utility consumption history provided by the first party by utilizing the plurality of utility rate schedules provided by the second party;

subscribing the consumer to a utility rate schedule which is identified among the plurality of utility rate schedules, and which provides cost savings for the consumer; and compensating the first and second parties for the cost savings realized by the consumer.

15. A computerized method as claimed in claim 14, wherein the step of accumulating utility consumption history further comprises:

providing a first party computer;

defining in the first party computer a first database for storing consumer information relating to the previous utility consumption by the consumer;

processing the previous utility consumption information to provide historical billing data relating to the utilities consumption by the consumer; and assigning an encrypted identifier to protect the consumers' identity, and wherein the encrypted identifier thereafter identifies the utility consumption information of the consumer.

16. A computerized method as claimed in claim 15, wherein after the step of defining the first database in the first party computer, and before the step of assigning an encrypted identifier to protect the consumer's identity, the method further comprises:

providing predetermined tolerance parameters which relate to the historical billing data to the first database; and receiving recent utility consumption information relating to the consumer and processing the recent utility consumption information against the predetermined tolerance parameters or otherwise establishing that the recent utility consumption information is valid for establishing a utility consumption history.

17. A computerized method as claimed in claim 16, wherein the step of accumulating a plurality of utility rate schedules by a second party further comprises:

providing a second party computer which is coupled in data exchanging relation relative to the first party computer, and wherein the second party computer cannot gain access to the consumer's identity in the first database;

defining a second database in the second party computer; and storing in the second database the plurality of utility rate schedules which were collected by the second party, and wherein the plurality of utility rate schedules are stored in the form of a computer readable template, and wherein the first party cannot gain access to the plurality of utility rate schedules which are stored in the second party database.

18. A computerized method as claimed in claim 17, wherein the step of processing the recent utility consumption information against the predetermined tolerance parameters further comprises:

providing a third party computer coupled in data exchanging relation relative to the first and second party computers;

defining a third party database in the third party computer;

storing in the third party database the utility consumption information bearing the encrypted identifier and which is supplied by the first party computer, and the utility rate schedules which are in the form of the computer readable template which is supplied by the second party computer;

processing the utility consumption information with the computer readable template to identify potential cost saving utility rates from among the plurality of utility rate schedules for the utility consumption information which bears the encrypted identifier; and supplying the potential cost saving utility rates correlated to the utility consumption information bearing the encrypted identifier to the first database which is in the first party computer.

19. A computerized method as claimed in claim 18, wherein the step of subscribing the consumer to a utility rate schedule further comprises:

determining cost savings tolerance parameters for the utility consumption information bearing the encrypted identifier, and wherein the cost saving tolerance parameters are stored in the first party database;

processing the potential cost saving utility rates supplied by the third party database and which meets the cost savings tolerance parameters against the utility consumption information collected by the first party;

providing the consumer with remote access to the potential cost savings utility rates meeting the cost saving tolerance parameters in a computer readable form; and permitting the consumer to select potential cost savings utility rates which meets the consumer's needs.

20. A computerized method as claimed in claim 19, wherein after the step of permitting the consumer to select the potential cost savings utility rates which meets the consumer's needs, the method further comprises:

implementing the election of the consumer with respect to the potential cost savings utility rates.

21. A computerized method for selecting an appropriate utility rate to provide cost savings for a consumer, comprising:

accumulating utility consumption history into a first database for at least one consumer by a first party, and wherein the first party assigns an encrypted identifier to the identity of the consumer and which relates to the utility consumption history stored in the first database;

analyzing the utility consumption history for the at least one consumer by the first party against predetermined tolerance parameters;

accumulating a plurality of utility rate schedules by a second party into a second database, and wherein the first party transmits the utility consumption history meeting the predetermined tolerance parameters and bearing the encrypted identifier from the first database to the second database;

analyzing in the second database the transmitted utility consumption history bearing the encrypted identifier with the utility rate schedules provided by the second party to determine potential cost savings for the consumer;

reporting utility rate schedules which provide potential cost savings for the consumer's consumption history which has been analyzed to the first party;

reporting to the consumer the utility rate schedules which provide potential cost savings by the first party;

affirmatively selecting and implementing utility rate schedules which provide advantageous cost savings by the consumer; and compensating the first and second parties for the cost savings realized by the consumer by the selection of the advantageous utility rate schedules.

22. A computerized method as claimed in claim 21, and wherein the step of accumulating utility consumption information further comprises:

providing a first party database in a first party computer;

storing in the first party database the consumer's utility consumption information collected by the first party, and which relates to the consumption of utilities by the consumer; and processing the utility consumption information to provide historical billing data relating to the consumption of the utilities by the consumer; and wherein the step of compensating the first and second parties includes sharing a portion of the cost savings realized by the consumer.

23. A computerized method as claimed in claim 22, and wherein after the step of accumulating utility consumption history into a first database, and before the first party assigns an encrypted identifier, the method further comprises:

processing the consumer's utility consumption history accumulated in the first database to provide the predetermined tolerance parameters; and performing an audit of the recent utility consumption information history of the consumer against the predetermined tolerance parameters to determine whether the recent utility consumption information history meets the predetermined tolerance parameters.

24. A computerized method as claimed in claim 21, and wherein before the step of analyzing in the second database the transmitted utility consumption history, the method further comprises:

determining a cost savings tolerance parameter for the customer consumer.

25. A computerized method as claimed in claim 21, and wherein after the step of affirmatively selecting and implementing utility rate schedules which provides advantageous cost savings, the method further comprises:
   subscribing the consumer to the selected utility rate schedule.

26. A computerized method as claimed in claim 22, and wherein the step of sharing a portion of the cost savings realized by the consumer further comprises:
   remitting payment to the first and second parties of a portion of the cost savings realized.

27. A computerized method for selecting an appropriate utility rate to provide cost savings for a consumer, comprising:
   accumulating utility usage history for at least one consumer in a first database by a first party, and wherein the first party analyzes the utility usage history of the consumer and develops predetermined tolerance parameters for the utility usage history based upon the utility usage history, and wherein the consumer has an agent;
   accumulating a plurality of utility rate schedules in a second database by a second party;
   accumulating and storing in the first party database recent utility consumption information of the consumer;
   providing an automated clearinghouse by a third party which receives the recent utility consumption information meeting the tolerance parameters from the first database, and the utility rate schedules from the second database, and wherein the automated clearing house analyzes the recent utility consumption information and the utility rate schedules received from the first and second parties to identify advantageous utility rate schedules which provide cost savings for the consumer, and which further inhibits the first and second parties from accessing the other parties data which has been submitted to the automated clearinghouse;
   reporting the identified advantageous rate schedules which provide cost savings, and which have been developed by the automated clearinghouse, and the third party, to the first party;
   reporting the identified advantageous rate schedules which provide cost savings to the consumer by the first party, and wherein the consumer or the agent of the utility user consumer remotely accesses the identified advantageous rate schedules to analyze and consider the identified advantageous rate schedules and then affirmatively selects a previously identified advantageous rate schedule which provides the desired cost savings; and
   sharing the cost savings realized by the consumer by the affirmative selection of a previously identified advantageous rate schedule by the consumer, or agent of the consumer, and remitting a portion of the cost savings realized by the consumer or agent of the consumer to the first, second and third parties.

28. A computerized method as claimed in claim 27, and wherein the step of accumulating the utility usage history for at least one consumer in a first database further comprises:
   providing a first party database in a first party computer;
   storing in the first party database consumer information and the utility usage history which was previously collected by the first party,
   processing the utility usage history to provide historical billing data relating to the consumption of the utilities by the consumer.

29. A computerized method as claimed in claim 28, and wherein after the step of developing the predetermined tolerance parameters for the utility usage history, the method further comprises:
   performing an audit of the recent utility consumption information of the consumer which was accumulated and stored in the first party database against the predetermined tolerance parameters to determine whether the recent utility consumption information of the consumer satisfies the predetermined tolerance parameters.

30. A computerized method as claimed in claim 29, and wherein the step of accumulating a plurality of utility rate schedules in a second database further comprises:
   providing a second party database in a second party computer.

31. A computerized method as claimed in claim 30, and wherein the step of providing an automated clearinghouse by a third party further comprises:
   providing a third party clearinghouse computer.

32. A computerized method as claimed in claim 31, and wherein before the step of reporting the identified advantageous rate schedules which could potentially provide cost savings to the consumer, the method further comprises:
   determining a cost savings parameter for the consumer.

* * * * *

UNITED STATES PATENT AND TRADEMARK OFFICE
CERTIFICATE OF CORRECTION

| | |
|---|---|
| PATENT NO. | : 7,149,727 B1 |
| APPLICATION NO. | : 09/704425 |
| DATED | : December 12, 2006 |
| INVENTOR(S) | : Kevin J. Nicholls et al. |

It is certified that error appears in the above-identified patent and that said Letters Patent is hereby corrected as shown below:

Title Page item 54 & Col. 1 (Title)
In the Title: Please replace "COMPUTERIZED SYSTEM AND METHOD FOR PROVIDING COST SAVINGS FOR CONSUMERS" with --COMPUTERIZED SYSTEM AND METHOD FOR SELECTING AN APPROPRIATE UTILITY RATE TO PROVIDE COST SAVINGS FOR CONSUMERS--.

Column 2, line 4, replace "the best 11 utility" with --the best utility--.

Column 4, line 32, replace "computer 11 system" with --computer system--.

Column 10, lines 17-44, delete the second instance of "Second Form of the Invention".

Column 12, line 43, replace "computers" with --computer--.

Column 16, line 12, replace "the customer consumer" with --the consumer--.

Column 17, line 26, replace "claim 3" with --claim 4--.

Column 18, line 12, replace "consumption history information" with --consumption information--.

Column 20, lines 60 and 62, please delete "information".

Column 21, line 2, replace "customer consumer." with --consumer.--.

Column 21, line 47, please delete "utility user".

UNITED STATES PATENT AND TRADEMARK OFFICE
CERTIFICATE OF CORRECTION

PATENT NO.        : 7,149,727 B1
APPLICATION NO. : 09/704425
DATED             : December 12, 2006
INVENTOR(S)       : Kevin J. Nicholls et al.

It is certified that error appears in the above-identified patent and that said Letters Patent is hereby corrected as shown below:

Column 22, line 18, replace "first party," with --first party; and--.

Signed and Sealed this

Twenty-second Day of July, 2008

JON W. DUDAS
*Director of the United States Patent and Trademark Office*